Figures 1, 2:
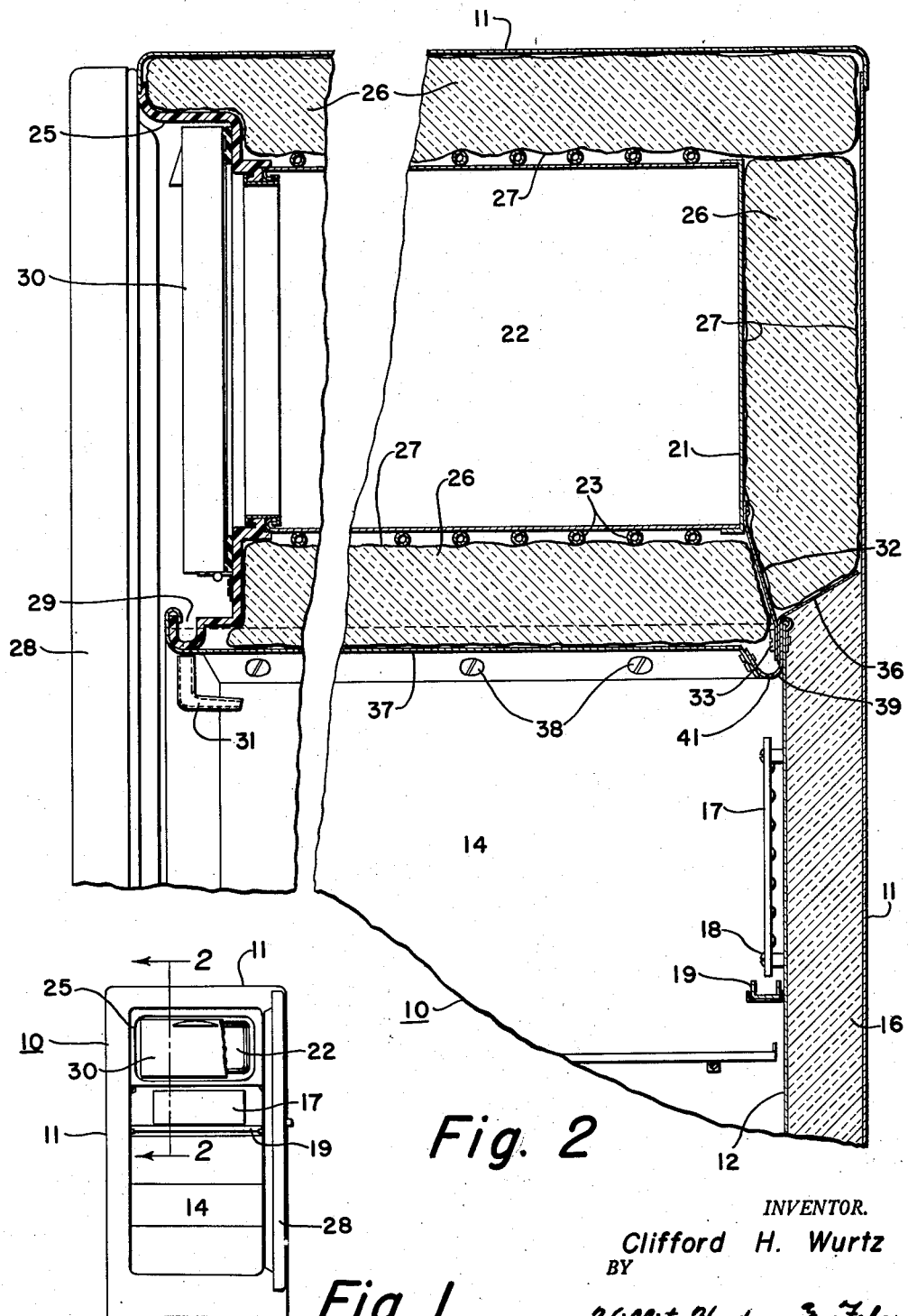

March 16, 1954

C. H. WURTZ 2,672,027

PLURAL REFRIGERATED COMPARTMENTS
WITH CONDENSATE DISPOSAL MEANS

Filed May 10, 1952

INVENTOR.
Clifford H. Wurtz
BY
Willits, Hardman & Fehr

Patented Mar. 16, 1954

2,672,027

UNITED STATES PATENT OFFICE 2,672,027

PLURAL REFRIGERATED COMPARTMENTS WITH CONDENSATE DISPOSAL MEANS

Clifford H. Wurtz, Oakwood, Ohio, assignor to General Motors Corporation, Dayton, Ohio, a corporation of Delaware Application May 10, 1952, Serial No. 287,140

7 Claims. (Cl. 62—103)

This invention relates to refrigerating apparatus and particularly to the construction of a refrigerator of the multiple different temperatured compartment variety.

Considerable difficulty has been experienced in properly insulating a refrigerator cabinet having separate compartments therein maintained at different temperatures relative to one another. This difficulty has presented itself due to the fact that it has been attempted to employ unpackaged or substantially loose insulating material for insulating the compartments. For example a household refrigerator cabinet wherein one liner forms a freezing or frozen food storage compartment and another liner forms an unfrozen food storage compartment the low temperature of a refrigerant evaporator, of a refrigerating system, surrounding the liner of the frozen food compartment causes air outside the cabinet to infiltrate the space or chamber about the frozen food compartment containing the insulating material. Consequently moisture in the infiltrated air condenses, in the form of frost or ice, upon the evaporator and outer wall surfaces of the liner of the frozen food compartment. It follows therefore that moisture in the form of frost or ice accumulates on the evaporator and exterior wall surfaces of the liner of the frozen food compartment and permeates into unpackaged or substantially loose insulating material about this compartment. Under certain conditions the permeability of moisture into the unpackaged or substantially loose insulating material causes diffusion of frost therein to such an extent that substantially the entire thickness of unpackaged or loose insulation, between the liner of the frozen food compartment and the cabinet outer walls, is filled with frost or snow-like crystals.

It is now customary not to defrost the evaporator which cools the interior of the frozen food compartment of multiple compartment refrigerators and to recommend that frost accumulated on the inside of this compartment be scraped therefrom as is the practice in such refrigerators as ice cream storage and dispensing cabinets. In spite of the fact that the freezing evaporator employed to cool the frozen food compartment is not intended to be defrosted there are nevertheless times when this evaporator will be defrosted. For example, a housewife may disconnect the electric circuit leading to the refrigerator unaware of the consequence hereinafter described. Also the electric circuit leading to the refrigerator may be accidentally opened or broken such as is caused by power line failure during summer storms and the like. In either event the temperature of the evaporator of the refrigerating system utilized to cool the frozen food compartment will increase above 32° F. and the layer of frost or diffused snow-like crystals within the insulating material surrounding this compartment will thaw and melt. Melting of the frost or snow-like crystals results in water being trapped in the space between the inner and outer walls of the refrigerator cabinet, occupied by the insulating material. This water in addition to causing serious damage to inner surfaces of the metal walls of the refrigerator cabinet, due to corrosion and rusting thereof, also reacts with the composition of the unpackaged insulating material in such a manner as to create a stench which is emitted from between the cabinet walls into the room containing the refrigerator cabinet. For these reasons I contemplate the construction of a two-compartment two-temperatured refrigerator cabinet wherein air infiltrating the insulating spaces or chambers about a low temperature freezing or frozen food compartment cannot enter or permeate the insulation disposed therein and wherein any moisture accumulated in the form of ice, frost or snow-like crystals in the space containing the insulating material will be drained therefrom to prevent its damaging the refrigerator cabinet or creating and emitting stench or foul odors should the evaporator employed to cool the frozen food compartment become accidentally ineffective to continuously produce temperatures below 32° F.

An object of my invention is to provide an improved mechanical refrigerator which can be manufactured at low cost and which will overcome difficulties resulting from prior improperly constructed refrigerators.

Another object of my invention is to provide a refrigerator having a frozen food compartment cooled by a freezing evaporator and an unfrozen food storage compartment cooled by a frosting and defrosting evaporator with means for directing and draining any moisture accumulated in the form of frost or ice about the freezing evaporator into the unfrozen food compartment and out of the same by way of a conventional outlet already provided in the refrigerator for removing water from the interior of the unfrozen food compartment, resulting from defrosting the frosting and defrosting evaporator, should the temperature of the freezing evaporator be increased above 32° F.

A further object of my invention is to provide an improved multiple compartment refrigerator wherein an open top food compartment forming liner supports another liner forming a freezing compartment thereabove and wherein provision is made for conducting water from the space occupied by insulating material about the freezing compartment into the food compartment therebelow.

Further objects and advantages of the present invention will be apparent from the following description, reference being had to the accompanying drawings, wherein a preferred form of the present invention is clearly shown.

In the drawings:

Figure 1 is a front view of a multiple compartment refrigerator cabinet having my invention embodied therein; and Figure 2 is a broken fragmentary enlarged vertical sectional view of the refrigerator shown in Figure 1 and is taken on the line 2—2 thereof.

Referring now to the drawings I have shown in Figure 1 thereof a refrigerator cabinet, generally represented by the reference character 10, having metal outer walls or panels 11 and an open top metal liner 12 (see Figure 2) spaced from the outer cabinet walls and forming an unfrozen food storage compartment 14 in the lower portion of cabinet 10. Unpackaged or unbagged substantially loose insulating material 16 is disposed in the space between outer cabinet walls 11 and liner 12 about the bottom and upright sides of compartment 14. Means for cooling the interior of compartment 14 is provided and this means is in the form of a plate-like sheet metal evaporator 17 within the compartment and secured in spaced relation to the rear wall of liner 12 by suitable spacers and the screws 18. Evaporator 17 is a frosting and defrosting evaporator and maintains the temperature of compartment 14 above 32° F. Any suitable or conventional method of or apparatus for causing defrosting of evaporator 17 may be employed. A long narrow open ended trough 19 may be mounted below evaporator 17 for catching defrost water therefrom and for conveying this water over to rear corners of compartment 14 where it may flow downwardly over liner 12 and out of compartment 14 to a suitable drain or water vaporizer (not shown).

The open top of liner 12 is disposed a substantial distance below the outer top wall of cabinet 10. A second metal liner 21, having an opening in the front thereof, is located above the open top of liner 12 and has its top, sides and back walls spaced inwardly of the outer walls 11 of cabinet 10. This liner 21 forms another food storage compartment 22 in the upper portion of cabinet 10. A freezing evaporator in the form of a conduit 23 provides refrigerant evaporating passages around the frozen food compartment 22 since this conduit is wrapped or coiled around the liner 21 and is secured in intimate thermal contact therewith. This evaporator 23 is adapted to maintain the interior of compartment 22 well below 32° F. at all times. The evaporators 17 and 23 may be connected in closed circuit relation with a refrigerant translating device of a refrigerating system or evaporator 17 may be in the form of a refrigerant evaporating portion of a closed secondary refrigerating system rendered effective by the temperature of evaporator 23. Such arrangements are now common and well known to those skilled in the art and for this reason no further exemplification of the type of refrigerating system employed to cool the present multiple temperatured compartment refrigerator is necessary. Insulation in bag or package form is disposed in the space between liner 21 and the cabinet outer walls 11. This bagged insulation comprises glass or mineral wool 26 hermetically sealed within flexible packages or casings such as the bags 27 of some suitable plastic material. I have found that these bags can be made of polyethylene or polyvinylidene chloride which prevents breathing of air into or out of the insulation disposed therein. The surfaces of bags 27, containing the insulation 26, are closely pressed against the conduits 23 of the freezing evaporator and against the back wall of liner 21. It is of course desirable to block access of moisture to freezing evaporator 23 as much as possible and to prevent any moisture from entering the bagged insulation. However it is a production impossibility, without involving great expense, to prevent the infiltration of some air and moisture to the cold surface of evaporator 23 and the outer surfaces of liner 21.

The edges of liner 21 at the open front thereof are secured in any suitable or conventional manner to a plastic or the like insulating collar 25 which has its top and sides secured to the cabinet outer metal walls 11. A door 30, suitably hinged to collar 25, normally closes the access opening or open front of compartment 22. Another door 28 extends substantially from the top to the bottom of cabinet 10 at the front thereof and normally closes the access opening or open front of the cabinet. A trough 29 provided along the bottom of collar 25 catches any moisture which tends to collect upon and drip from door 30. This trough 29 has an outlet opening leading into a small funnel-like elbow conduit 31 employed to convey drip water from trough 29 onto the side walls of liner 12 from where it may flow to the drain opening in the bottom of compartment 14. A bracket 32, formed of low heat conductive metal, in the rear portion of cabinet 10 has its one end secured to liner 21 in any suitable or conventional manner and has its other or lower end secured, by a screw 33, to the top edge of liner 12. It is to be understood that any number of such brackets 32 may be employed as are necessary to support liner 21 together with the weight of contents stored in compartment 22 and that these low heat conductive brackets may, if desired, be formed of rigid insulating material. For example other brackets 32 may be secured to the sides of liner 21 and the sides of liner 12. A metal baffle member 36 is also attached to the upper edge of liner 12 by the screws 33 and this baffle extends outwardly from liner 12 upwardly at an angle for a purpose to be presently described. The baffle 36 extends around three sides of cabinet 10 and forms a divider between the insulation 16 about compartment 14 and the bagged insulation about compartment 22. Baffle 36 has its upper outer edge spaced from the outer cabinet walls 11 to permit breathing of the chamber containing the insulation 16 into the chamber containing the bagged insulation. Bagged insulation is also placed beneath liner 21 and pressed against the freezing evaporator coils 23. A water collecting device or means which forms the top wall of compartment 14 is provided in the present disclosure for a purpose to be hereinafter described. This collecting device or means includes a metal plate 37 located under the bagged insulation beneath compartment 22 which is hooked over a lip on trough 29 and secured, by screws 38, to a metal trough 39. Trough 39 forms a part of the water collecting means and is also secured by the screws 33 to the edges of liner 12 at its open top. This trough 39 extends around the sides and the back of plate or partitioning member 37 and is provided with one or more openings 41 above evaporator 17 to permit water received therein, as will be presently described, to drip onto evaporator 17 and into the trough 19. The separate plate 37 and portions of trough 39 along the sides of cabinet 10 may be inclined in a direction downwardly from the front of the cabinet to the rear thereof to augment the flow of water toward the outlet openings 41.

In a refrigerator of the type herein disclosed the freezing evaporator 23 is intended to at all times be maintained below 32° F. and should never be defrosted. Since air from exterially of cabinet 10 will infiltrate the insulating chambers thereof moisture contained in the air will be drawn to the coldest surfaces within the insulation containing chambers between the liners and outer walls 11 of cabinet 10. Thus any moisture in air entering the chamber containing the unbagged insulating material 16 will be drawn into the upper chamber or spaces containing the bagged insulation. This is permitted by virtue of the breather passages provided by spacing divider or baffle 36 a short distance away from the inner surface of the cabinet outer walls 11. In this manner the chamber containing the insulating material 16 and the material itself is maintained in a substantially dry condition. Moisture in air which may infiltrate the chamber containing the bagged insulation together with that removed from the lower insulated portion of cabinet 10 will find its way into crevices or the like, at the point where the bags 27 overlap one another, to surfaces of the freezing evaporator 23 and liner 21. This moisture will condense and freeze on such cold surfaces and also on surfaces of the bags 27 adjacent thereto. In accordance with my invention I construct the present refrigerator in such a manner that melting of the frost or ice in the packaged or bagged insulation chamber will do no harm since it is drained therefrom and caused to flow to the exterior of the refrigerator cabinet. For example should the temperature of freezing exaporator 23 rise above 32° F. for any reason to cause the frost or ice thereon, on liner 21 and on bags 27 to melt the water resulting therefrom will flow along the bags, onto plate or partition member 37 and from baffle 36 into the trough 39. This water will flow out of trough 39 into compartment 14 by way of the drain hole 41, provided in trough 39, onto the frosting and defrosting evaporator 17 and thence into the drip trough 19. The water may flow from trough 19 down the inner surfaces of liner 12 to a drain opening in the bottom wall of compartment 14 to the exterior of cabinet 10.

From the foregoing it should be apparent that I have provided an improved refrigerator cabinet while at the same time keeping the manufacturing cost thereof as low as possible due to the fact that the porcelain enameled liner of the lower food compartment is terminated a substantial distance below the cabinet outer top wall. The construction and arrangement of elements in my improved refrigerator prevents the cabinet from becoming damaged and deteriorated should the freezing evaporator associated with the frozen food storage compartment be accidentally defrosted from time to time. My arrangement provides an effective manner of removing defrost water from the cabinet to thus eliminate the possibility of such water reacting with the insulating material in the cabinet and giving off stench odors.

While the form of embodiment of the invention as herein disclosed constitutes a preferred form, it is to be understood that other forms might be adopted, as may come within the scope of the claims which follow.

What is claimed is as follows:

1. A refrigerator comprising, a cabinet having outer walls, an open top metal liner spaced from said cabinet outer walls, insulating material in the space between said cabinet outer walls and said liner, the open top of said liner being located a substantial distance below the top wall of said cabinet and forming a food storage compartment in the lower portion of said cabinet, means for refrigerating the interior of said lower food compartment to a temperature above freezing; a second metal liner above said open top liner spaced from said cabinet outer walls and forming another food storage compartment in the upper portion of said cabinet, means forming a plurality of refrigerant evaporating passages about said second liner for cooling the interior of said another food compartment to a temperature below freezing, insulation in hermetically sealed bag form in the space between said cabinet outer walls and said second liner pressed against said refrigerant passage forming means, a plate spaced from the bottom of said second liner forming the top of said lower compartment, insulation in hermetically sealed bag form in the space between the bottom of said second liner and said plate pressed against said refrigerant passage forming means, means for supporting said plate from said open top liner, said last named means being in the form of a trough extending along edges of said plate, said trough being adapted to receive condensate water from the spaces in which said bagged insulation is disposed, and means for directing water received in said trough into said lower food storage compartment.

2. A refrigerator comprising, a cabinet having outer walls, an open top metal liner spaced from said cabinet outer walls, insulating material in the space between said cabinet outer walls and said liner, the open top of said liner being located a substantial distance below the top wall of said cabinet and forming a food storage compartment in the lower portion of said cabinet, means for refrigerating the interior of said lower food compartment to a temperature above freezing, a second metal liner above said open top liner spaced from said cabinet outer walls and forming another food storage compartment in the upper portion of said cabinet, means forming a plurality of refrigerant evaporating passages about said second liner for cooling the interior of said another food compartment to a temperature below freezing, insulation in hermetically sealed bag form in the space between said cabinet outer walls and said second liner pressed against said refrigerant passage forming means, a plate spaced from the bottom of said second liner forming the top of said lower compartment, insulation in hermetically sealed bag form in the space between the bottom of said second liner and said plate pressed against said refrigerant passage forming means, a baffle member attached to the upper edge portion of said open top liner and extending upwardly at an angle toward said cabinet outer walls, said baffle member being spaced from said cabinet outer walls to provide breather openings between the space occupied by the insulating material about said lower compartment and the space occupied by said bagged insulation, means for supporting said plate from said open top liner, said last named means including a trough extending around edges of said plate and adapted to receive condensate water from the spaces containing said bagged insulation, and said trough being provided with an opening for directing water received thereby into said lower food storage compartment.

3. A refrigerator comprising, a cabinet having outer metallic walls, an open top metal liner spaced from said cabinet outer walls, unpackaged insulating material in the space between said cabinet outer walls and said open top liner, the open top of said liner being located a substantial distance below the top wall of said cabinet and forming a food storage compartment in the lower portion of said cabinet, means for refrigerating the interior of said lower food compartment to a temperature above freezing, a second metal liner spaced from said cabinet outer walls, bracket means for supporting said second liner above and upon said open top liner to provide another food storage compartment in the upper portion of said cabinet, means forming a plurality of refrigerant evaporating passages about said second liner for cooling the interior of said another food compartment to a temperature below freezing, insulation in hermetically sealed package form in the space between said cabinet outer walls and said second liner pressed against said refrigerant passage forming means, a metal plate spaced from the bottom of said second liner forming the top of said lower compartment, insulation in hermetically sealed package form in the space between the bottom of said second liner and said metal plate pressed against said refrigerant passage forming means, a metal trough secured to and extending along edges of said metal plate, said trough being secured to said open top liner to support said plate in its respective position, said trough being adapted to receive condensate water from the spaces in which said packaged insulation is disposed, and means for directing water received in said trough into said lower food storage compartment.

4. A refrigerator comprising, a cabinet having outer metallic walls, an open top metal liner spaced from said cabinet outer walls, unpackaged insulating material in the space between said cabinet outer walls and said open top liner, the open top of said liner being located a substantial distance below the top wall of said cabinet and forming a food storage compartment in the lower portion of said cabinet, means for refrigerating the interior of said lower food compartment to a temperature above freezing, a second metal liner spaced from said cabinet outer walls, bracket means for supporting said second liner above and upon said open top liner to provide another food storage compartment in the upper portion of said cabinet, means forming a plurality of refrigerant evaporating passages about said second liner for cooling the interior of said another food compartment to a temperature below freezing, insulation in hermetically sealed package form in the space between said cabinet outer walls and said second liner pressed against said refrigerant passage forming means, a metal plate spaced from the bottom of said second liner forming the top of said lower compartment, insulation in hermetically sealed package form in the space between the bottom of said second liner and said metal plate pressed against said refrigerant passage forming means, a baffle member attached to the upper edge portion of said open top liner and extending upwardly at an angle toward said cabinet outer walls, said baffle member being spaced from said cabinet outer walls to provide breather openings between the space occupied by the unpackaged insulation, means for supporting said plate from said open top liner, said last named means including a trough extending around edges of said plate and adapted to receive condensate water from the spaces containing said packaged insulation, and said trough being provided with an opening for directing water received thereby into said lower food storage compartment.

5. A refrigerator comprising, a cabinet having outer walls, an open top metal liner spaced from said cabinet outer walls, insulating material in the space between said cabinet outer walls and said open top liner, the open top of said liner being located a substantial distance below the top wall of said cabinet and forming a food storage compartment in the lower portion of said cabinet, means for refrigerating the interior of said lower food compartment to a temperature above freezing, a second metal liner spaced from said cabinet outer walls and disposed above said open top liner to provide another food storage compartment in the upper portion of said cabinet, means for refrigerating the interior of said another food compartment to a temperature below freezing, insulation in the space between said cabinet outer walls and said second liner, a water collecting and conveying device spaced from the bottom of said second liner, insulation in the space between the bottom of said second liner and said device, said device including a metal plate portion separate from said liners and forming the top wall of said lower food compartment and a trough portion along at least one side of said plate portion, said trough portion of said device being secured to the upper edge part of said open top liner and supporting said plate portion of the device in its compartment top wall forming position, said plate portion of said device being adapted to receive condensate water from the exterior of said second liner and to convey the water into said trough portion, and the trough portion of said device having an opening therein for directing water received thereby into said lower compartment.

6. A refrigerator comprising, a cabinet having outer walls, an open top metal liner spaced from said cabinet outer walls, insulating material in the space between said cabinet outer walls and said open top liner, the open top of said liner being located a substantial distance below the top wall of said cabinet and forming a food storage compartment in the lower portion of said cabinet, means for refrigerating the interior of said lower food compartment to a temperature above freezing, a second metal liner spaced from said cabinet outer walls and disposed above said open top liner to provide another food storage compartment in the upper portion of said cabinet, means for refrigerating the interior of said another food compartment to a temperature below freezing, insulation in the space between said cabinet outer walls and said second liner, a water collecting and conveying device spaced from the bottom of said second liner, insulation in the space between the bottom of said second liner and said device, said device including a metal plate portion separate from said liners and forming the top wall of said lower food compartment, a trough portion along at least one side thereof and a baffle portion, said baffle portion of said device being secured to the upper edge part of said open top liner and extending upwardly therefrom at an angle toward an outer wall of said cabinet, said trough portion of said device being secured to the upper edge part of said open top liner and supporting said plate portion of the device in its compartment top wall forming position, said plate portion and said baffle portion of said device being adapted to receive condensate water from the insulated spaces about said second liner and to convey the water into said trough portion, and the trough portion of said device having an opening therein for directing water received thereby into said lower compartment.

7. A refrigerating apparatus comprising, a cabinet having outer walls forming a chamber therein, said chamber presenting a forwardly directed access opening, a door normally closing said chamber access opening, an open top liner disposed in said chamber and spaced from said cabinet outer walls, insulating material in the space between said cabinet outer walls and said liner, the open top of said liner being located a substantial distance below the top wall of said cabinet and forming an unfrozen food storage compartment in the lower portion of said cabinet, a second liner disposed in said chamber above the open top liner and forming a frozen food storage compartment in the upper portion of said cabinet, said second liner being spaced from said cabinet outer walls, insulating material substantially filling the space between said cabinet outer walls and said second liner, means for supporting said second liner from the edges of the open top of said unfrozen food compartment forming liner, said frozen food compartment having an access opening facing said chamber door, a closure member within said chamber normally closing the access opening of said frozen food compartment, a partitioning member spaced below the bottom wall of said second liner, insulating material substantially filling the space between the bottom wall of said second liner and said partitioning member, said partitioning member also being supported from the edges of the open top of said unfrozen food compartment forming liner, means for refrigerating said frozen food storage compartment, means for refrigerating said unfrozen food storage compartment, a trough associated with said partitioning member and extending continuously along at least one side of said open top liner for receiving condensate water from said partitioning member and from the insulated spaces about said second liner, and said trough having a discharge opening for directing water received therein into said unfrozen food storage compartment.

CLIFFORD H. WURTZ.

References Cited in the file of this patent

UNITED STATES PATENTS

| Number | Name | Date |
|---|---|---|
| 2,595,874 | Nason | May 6, 1952 |
| 2,613,509 | Phillip | Oct. 14, 1952 |